(12) United States Patent
Aono et al.

(10) Patent No.: US 11,346,407 B2
(45) Date of Patent: May 31, 2022

(54) CENTRIFUGAL CLUTCH

(71) Applicant: Kabushiki Kaisha F.C.C., Hamamatsu (JP)

(72) Inventors: Kaoru Aono, Shizuoka (JP); Yuta Yokomichi, Shizuoka (JP); Yuta Kine, Shizuoka (JP); Makoto Kataoka, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 12 days.

(21) Appl. No.: 16/960,482

(22) PCT Filed: Oct. 26, 2018

(86) PCT No.: PCT/JP2018/039840
§ 371 (c)(1),
(2) Date: Jul. 7, 2020

(87) PCT Pub. No.: WO2019/138653
PCT Pub. Date: Jul. 18, 2019

(65) Prior Publication Data
US 2020/0340540 A1    Oct. 29, 2020

(30) Foreign Application Priority Data
Jan. 15, 2018   (JP) .............................. JP2018-004318

(51) Int. Cl.
*F16D 43/18*      (2006.01)
*F16D 43/14*      (2006.01)

(52) U.S. Cl.
CPC ........ *F16D 43/18* (2013.01); *F16D 2043/145* (2013.01)

(58) Field of Classification Search
CPC ..... F16D 43/14; F16D 43/18; F16D 2043/145
See application file for complete search history.

(56) References Cited

U.S. PATENT DOCUMENTS

| 3,552,904 A * | 1/1971 | Lancey ................. F16D 43/18 |
| | | 192/105 CD |
| 4,192,412 A | 3/1980 | Stoner |

(Continued)

FOREIGN PATENT DOCUMENTS

| DE | 4300442 A1 | 7/1994 |
| EP | 1598571 A1 | 11/2005 |

(Continued)

OTHER PUBLICATIONS

International Search Report (ISR) dated Jan. 29, 2019 filed in PCT/JP2018/039840.

(Continued)

*Primary Examiner* — Timothy Hannon
(74) *Attorney, Agent, or Firm* — Rankin, Hill & Clark LLP

(57) ABSTRACT

Provided is a centrifugal clutch configured so that a clutch capacity can be increased with a simple configuration. A centrifugal clutch 200 includes a drive plate 210 to be directly rotatably driven by drive force of an engine. The drive plate 210 includes each of swing support pins 214 and protruding bodies 218. The swing support pin 214 is fitted in a pin slide hole 231 formed at a clutch weight 230 to swingably support the clutch weight 230. The protruding body 218 is formed as a cylindrical roller. A driven portion 235 of the clutch weight 230 contacts the protruding body 218. The pin slide hole 231 is formed in a long hole shape allowing backward displacement of the clutch weight 230 in the rotary drive direction of the drive plate 210. The driven portion 235 is formed to extend inclined toward an outer rear side in a rotary drive direction of the drive plate 210.

13 Claims, 10 Drawing Sheets

(56) References Cited

U.S. PATENT DOCUMENTS

| | | | | |
|---|---|---|---|---|
| 4,226,320 A * | 10/1980 | St. John | ................. | F16D 43/18 |
| | | | | 192/105 CD |
| 4,254,854 A * | 3/1981 | St. John | ................. | F16D 43/18 |
| | | | | 188/184 |
| 7,600,625 B2 * | 10/2009 | Ishikawa | ................. | F16D 43/18 |
| | | | | 192/105 CD |
| 2008/0053783 A1 * | 3/2008 | Lean | ..................... | F16D 43/14 |
| | | | | 192/105 CD |
| 2011/0240433 A1 | 10/2011 | Fang et al. | | |
| 2012/0006644 A1 | 1/2012 | Chabrut | | |
| 2019/0072140 A1 | 3/2019 | Aono et al. | | |
| 2019/0120301 A1 * | 4/2019 | Liu | ........................ | F16D 43/18 |
| 2020/0370607 A1 * | 11/2020 | Aono | ..................... | F16D 43/18 |
| 2021/0108687 A1 * | 4/2021 | Aono | ................... | F16D 43/211 |

FOREIGN PATENT DOCUMENTS

| | | |
|---|---|---|
| EP | 1780436 A1 | 5/2007 |
| EP | 3486518 A1 | 5/2019 |
| JP | 59-94624 U | 6/1984 |
| JP | 2006-38124 A | 2/2006 |
| JP | 3134915 U | 8/2007 |
| JP | 3168535 U | 6/2011 |
| JP | 2015-203429 A | 11/2015 |
| JP | 2017-3049 A | 1/2017 |
| JP | 2017-72211 A | 4/2017 |

OTHER PUBLICATIONS

Extended European Search Report (EESR) dated Sep. 23, 2021 for the corresponding European Patent Application No. 18899375.2.

\* cited by examiner

CENTRIFUGAL CLUTCH

TECHNICAL FIELD

The present invention relates to a centrifugal clutch configured to block transmission of rotary drive force to a driven side until an engine reaches a predetermined number of rotations and transmit the rotary drive force to the driven side when the engine reaches the predetermined number of rotations.

BACKGROUND ART

Typically, in, e.g., a motorcycle or a string trimmer, a centrifugal clutch configured to transmit rotary drive force to a driven side when an engine reaches a predetermined number of rotations is used. For example, in a centrifugal clutch disclosed in Patent Literature 1 below, a clutch weight provided at one drive plate gradually displaces to a clutch outer side in association with an increase in the number of rotations of the engine. A clutch shoe provided at the clutch weight friction-contacts the clutch weight.

CITATION LIST

Patent Literature

PATENT LITERATURE 1: JP-A-2006-38124
PATENT LITERATURE 2: JP-A-2015-203429

However, in the centrifugal clutch described in Patent Literature 1 above, the clutch weight gradually friction-contacts the clutch outer according to an increase in the number of rotations of the engine. Thus, time until the clutch is brought into a coupling state after the number of rotations of the engine has started increasing is long, and for this reason, there is a problem that fuel economy is lowered and a clutch capacity is small. On the other hand, in the centrifugal clutch described in Patent Literature 2 above, a drive plate to be rotated by rotation of an engine includes two drive plates of the first and second drive plates. Thus, there is a problem that due to an increase in the number of components, a configuration is complicated and a manufacturing burden is increased.

The present invention has been made to address the above-described problems. An object of the present invention is to provide a centrifugal clutch configured so that a clutch capacity can be increased with a simple configuration.

SUMMARY OF THE INVENTION

In order to achieve the above object, a feature of the present invention includes: a drive plate to be rotatably driven together with a driven pulley in response to drive force of an engine; a clutch outer having, outside the drive plate, a cylindrical surface provided concentrically with the drive plate; a clutch weight having a clutch shoe formed to extend along a circumferential direction of the drive plate and facing the cylindrical surface of the clutch outer, one end side of the clutch weight in the circumferential direction being turnably attached onto the drive plate through a swing support pin and a pin slide hole, the other end side displacing toward a cylindrical surface side of the clutch outer; a protruding body provided to protrude toward the clutch weight from the drive plate; a driven portion provided at the clutch weight and configured to climb on the protruding body upon displacement of the other end side of the clutch weight; and a pivot-point-side slide member provided between the swing support pin and the pin slide hole to slide the swing support pin and the pin slide hole, wherein the swing support pin is provided at one of the drive plate or the clutch weight, and is formed to extend toward the other one of the drive plate or the clutch weight, and the pin slide hole is provided at the other one of the drive plate or the clutch weight and is formed in a long hole shape allowing backward displacement of one end side of the clutch weight in a rotary drive direction of the drive plate, and the swing support pin is slidably displaceably fitted in the pin slide hole through the pivot-point-side slide member.

In order to achieve the above object, a feature of the present invention includes: a drive plate to be rotatably driven together with a driven pulley in response to drive force of an engine; a clutch outer having, outside the drive plate, a cylindrical surface provided concentrically with the drive plate; a clutch weight having a clutch shoe formed to extend along a circumferential direction of the drive plate and facing the cylindrical surface of the clutch outer, one end side of the clutch weight in the circumferential direction being turnably attached onto the drive plate through a swing support pin and a pin slide hole, the other end side displacing toward a cylindrical surface side of the clutch outer; a protruding body provided to protrude toward the clutch weight from the drive plate; and a driven portion provided at the clutch weight and configured to climb on the protruding body upon displacement of the other end side of the clutch weight, wherein one of portions of the protruding body and the driven portion sliding on each other is made of a metal material, and the other one of the portions is made of a resin material, the swing support pin is provided at one of the drive plate or the clutch weight, and is formed to extend toward the other one of the drive plate or the clutch weight, and the pin slide hole is provided at the other one of the drive plate or the clutch weight and is formed in a long hole shape allowing backward displacement of one end side of the clutch weight in a rotary drive direction of the drive plate, and the swing support pin is slidably fitted in the pin slide hole.

In order to achieve the above object, a feature of the present invention includes: a drive plate to be rotatably driven together with a driven pulley in response to drive force of an engine; a clutch outer having, outside the drive plate, a cylindrical surface provided concentrically with the drive plate; a clutch weight having a clutch shoe formed to extend along a circumferential direction of the drive plate and facing the cylindrical surface of the clutch outer, one end side of the clutch weight in the circumferential direction being turnably attached onto the drive plate through a swing support pin and a pin slide hole, the other end side displacing toward a cylindrical surface side of the clutch outer; a protruding body rotatably provided on a protruding body support pin provided on the drive plate and protruding toward the clutch weight; a driven portion provided at the clutch weight and configured to climb on the protruding body upon displacement of the other end side of the clutch weight; and an auxiliary swing-side slide member provided between the protruding body support pin and the protruding body to slide the protruding body support pin and the protruding body, wherein the swing support pin is provided at one of the drive plate or the clutch weight, and is formed to extend toward the other one of the drive plate or the clutch weight, and the pin slide hole is provided at the other one of the drive plate or the clutch weight and is formed in a long hole shape allowing backward displacement of one end side of the clutch weight in a rotary drive direction of the drive plate, and the swing support pin is slidably fitted in the pin slide hole.

According to the feature of the present invention configured as described above, in the centrifugal clutch, the drive plate and the clutch weight are coupled through the long-hole-shaped pin slide hole and the swing support pin slidably fitted to each other. Thus, the drive plate is rotatably driven such that the clutch shoe contacts the clutch outer, and in this manner, the clutch weight shifts to a rear side in the rotary drive direction, the driven portion climbs on the protruding body, and the clutch shoe quickly presses the clutch outer. That is, since the clutch shoe can be strongly pressed against the clutch outer even with one drive plate, the centrifugal clutch can increase the clutch capacity with a simple configuration.

Note that the long hole in each of the above-described aspects of the invention is a through-hole or a blind hole extending long and thin as a whole, and a length in one direction is longer than that in a width direction perpendicular to the one direction.

In addition, still another feature of the present invention is that in the centrifugal clutch, each of the swing support pin and the pin slide hole is made of a metal material and the pivot-point-side slide member is made of a resin material.

According to still another feature of the present invention configured as described above, in the centrifugal clutch, each of the swing support pin and the pin slide hole is made of the metal material, and the pivot-point-side slide member is made of the resin material. Thus, slidability between each of the swing support pin and the pin slide hole and the pivot-point-side slide member is improved. Consequently, the clutch weight can more smoothly turnably displace relative to the clutch outer, and abrasion of the swing support pin and the pin slide hole can be prevented.

In this case, thermoplastic resin or thermosetting resin having thermal resistance and abrasion resistance can be used as the resin material forming the pivot-point-side slide member, and engineering plastic or super engineering plastic is preferable. Specifically, polyetheretherketone resin (PEEK), polyphenylene sulfide resin (PPS), polyamide-imide resin (PAI), fluorine resin (PTFE), or polyimide resin (PI) can be used as the thermoplastic resin. Diallyphthalate resin (PDAP), epoxy resin (EP), or silicon resin (SI) can be used as the thermosetting resin.

Moreover, still another feature of the present invention is that in the centrifugal clutch, the pivot-point-side slide member is rotatably slidably fitted onto the swing support pin.

According to still another feature of the present invention configured as described above, in the centrifugal clutch, the pivot-point-side slide member is rotatably slidably fitted onto the swing support pin. Thus, the slidability between the swing support pin and the pin slide hole can be improved, and therefore, the clutch weight can more smoothly turnably displace relative to the clutch outer.

Further, still another feature of the present invention is that the centrifugal clutch further includes an auxiliary pivot-point-side slide member provided between the swing support pin and the pivot-point-side slide member to slide the swing support pin and the pivot-point-side slide member.

According to still another feature of the present invention configured as described above, the centrifugal clutch further includes the auxiliary pivot-point-side slide member provided between the swing support pin and the pivot-point-side slide member to slide the swing support pin and the pivot-point-side slide member. Thus, slidability between the swing support pin and the pivot-point-side slide member can be improved, and the clutch weight can more smoothly turnably displace relative to the clutch outer. In this case, the auxiliary pivot-point-side slide member may be provided in a non-rotatable non-slidable fixed state on the swing support pin, or may be provided in a rotatable slidable state.

Moreover, the auxiliary pivot-point-side slide member is formed in such a tubular shape that the auxiliary pivot-point-side slide member is slidable on each of the swing support pin and the pivot-point-side slide member. Thus, even in a case where the auxiliary pivot-point-side slide member is fixed on the swing support pin or a case where the auxiliary pivot-point-side slide member and the pivot-point-side slide member are fixed to each other, the slidability between the swing support pin and the pin slide hole can be ensured. The auxiliary pivot-point-side slide member can be made of an aluminum material or a resin material similar to that of the pivot-point-side slide member.

Further, still another feature of the present invention is that in the centrifugal clutch, one of portions of the protruding body and the driven portion sliding on each other is made of a metal material, and the other one of the portions is made of a resin material.

According to still another feature of the present invention configured as described above, in the centrifugal clutch, one of the portions of the protruding body and the driven portion sliding on each other is made of the metal material, and the other one of the portions is made of the resin material. Thus, slidability between the protruding body and the drive portion is improved, and therefore, the clutch weight can more smoothly turnably displace relative to the clutch outer. In this case, the resin material forming the protruding body or the driven portion can be a resin material similar to that of the pivot-point-side slide member.

In addition, still another feature of the present invention is that in the centrifugal clutch, the protruding body is rotatably provided at a protruding body support pin provided on the drive plate, and includes an auxiliary swing-side slide member provided between the protruding body support pin and the protruding body to slide the protruding body support pin and the protruding body.

According to still another feature of the present invention configured as described above, in the centrifugal clutch, the protruding body is rotatably provided at the protruding body support pin provided on the drive plate. Further, the protruding body includes the auxiliary swing-side slide member provided between the protruding body support pin and the protruding body to slide the protruding body support pin and the protruding body. Thus, slidability between the protruding body support pin and the protruding body can be improved, and the clutch weight can more smoothly turnably displace relative to the clutch outer. In this case, the auxiliary swing-side slide member may be provided in a non-rotatable non-slidable fixed state on the protruding body support pin, or may be provided in a rotatable slidable state.

Moreover, the auxiliary swing-side slide member is formed in such a tubular shape that the auxiliary swing-side slide member is slidable on each of the protruding body support pin and the protruding body. Thus, even in a case where the auxiliary swing-side slide member is fixed on the protruding body support pin or a case where the auxiliary swing-side slide member and the protruding body are fixed to each other, the slidability between the protruding body support pin and the protruding body can be ensured. Further, the auxiliary swing-side slide member can be made of an aluminum material or a resin material similar to that of the pivot-point-side slide member.

Moreover, another feature of the present invention is that in the centrifugal clutch, the swing support pin is provided at the drive plate and the pin slide hole is provided at the clutch weight.

According to another feature of the present invention configured described above, in the centrifugal clutch, the swing support pin is provided at the drive plate, and the pin slide hole is provided at the clutch weight. Thus, a burden in production of the clutch weight can be reduced as compared to a case where the swing support pin is provided at the clutch weight.

In addition, still another feature of the present invention is that in the centrifugal clutch, the pin slide hole is formed as a long hole with such a length that collision with the swing support pin is avoided even in a case where one end side of the clutch weight displaces backward in the rotary drive direction of the drive plate.

According to still another feature of the present invention configured as described above, in the centrifugal clutch, the long hole is formed with such a length that a clearance is ensured without collision of the swing support pin with an end portion of the pin slide hole even in a case where one end side of the clutch weight displaces backward in the rotary drive direction of the drive plate. Thus, when the clutch weight displaces backward in the rotary drive direction of the drive plate, the driven portion can sufficiently climb on the protruding body. Consequently, the clutch shoe can be strongly pressed by the clutch outer.

DESCRIPTION OF EMBODIMENTS

Figure 1:
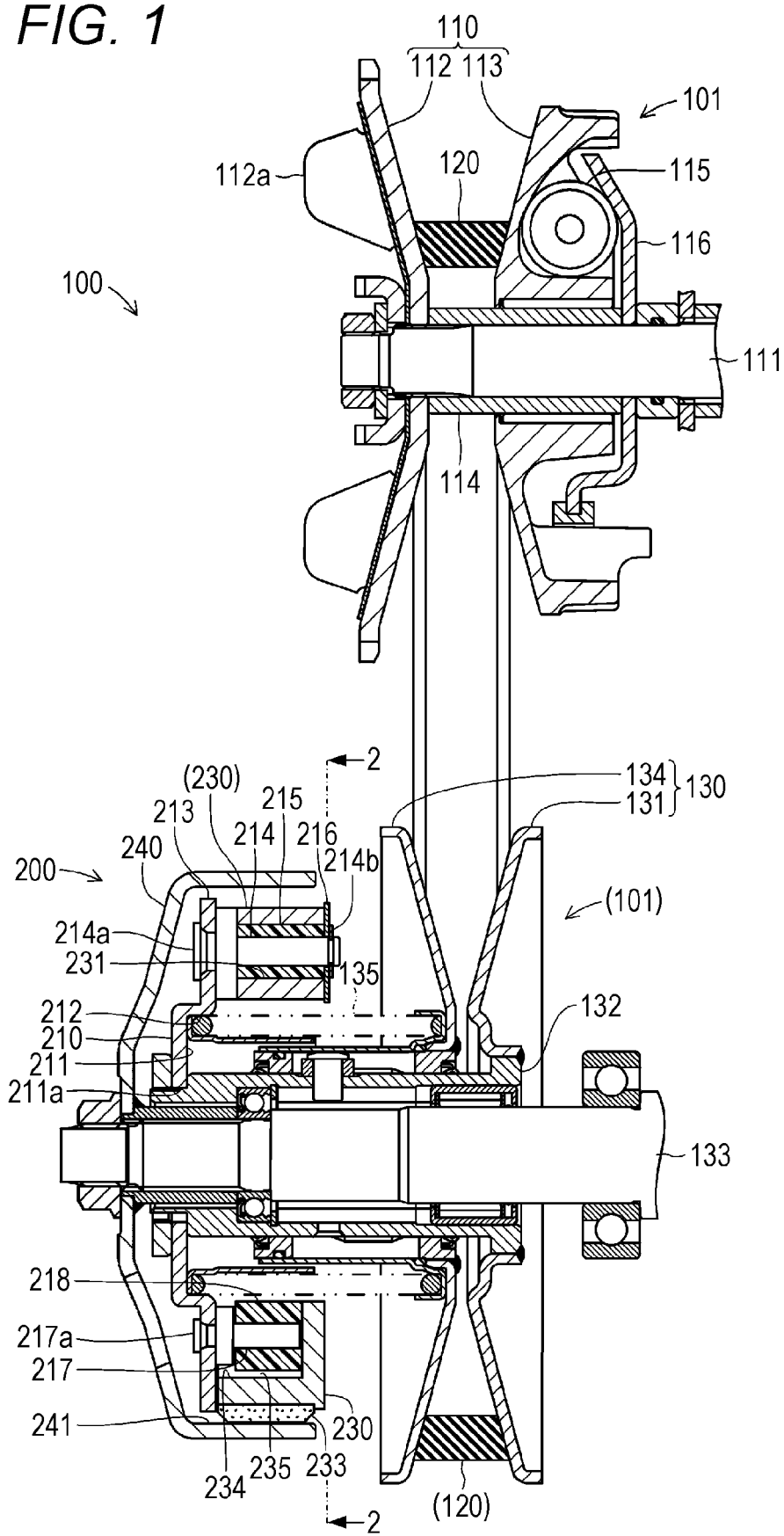
FIG. 1 is a plan sectional view schematically illustrating a configuration of a power transmission mechanism including a centrifugal clutch according to the present invention.
Figure 2:
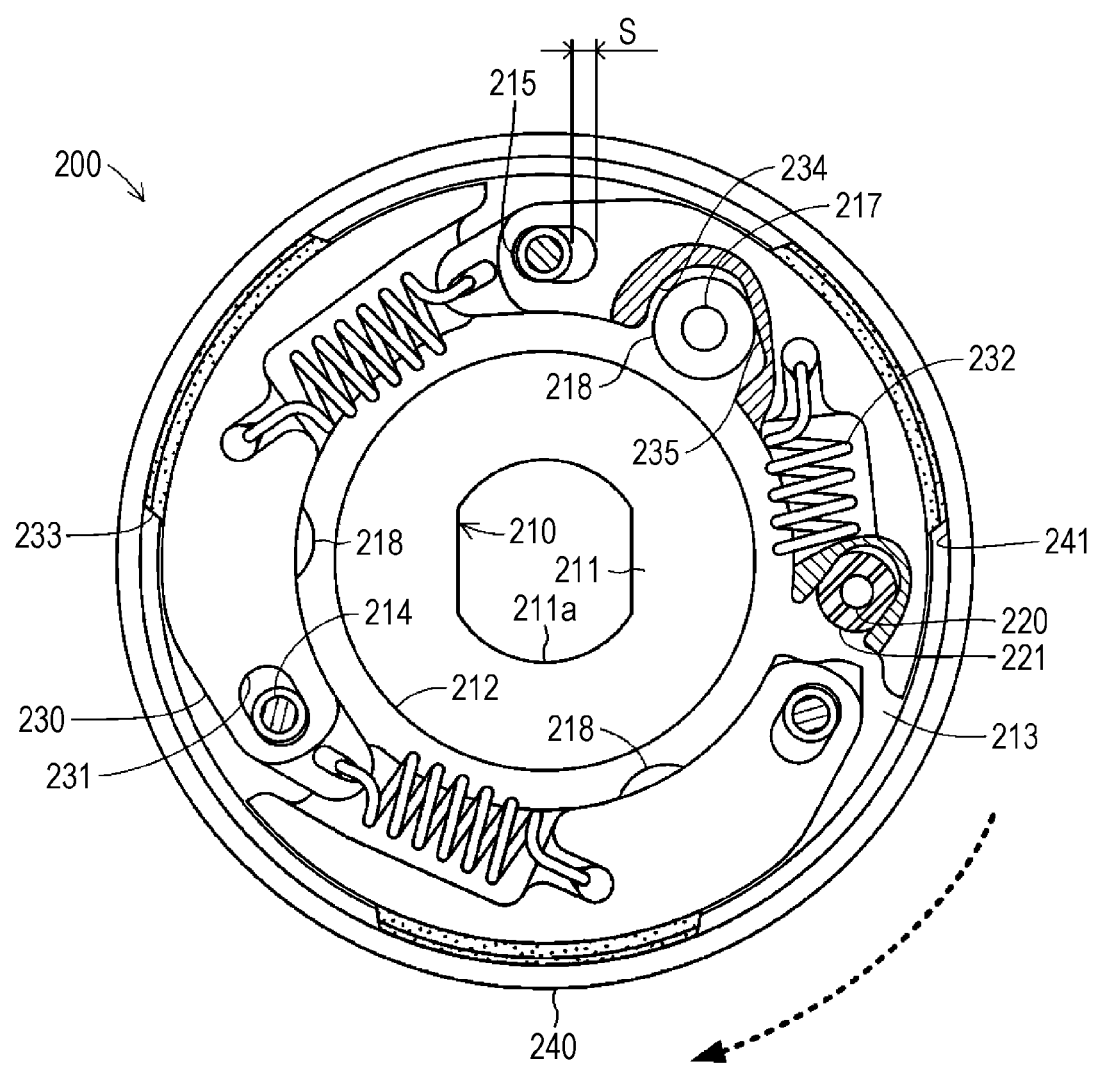
FIG. 2 is a side view of the centrifugal clutch as seen from a 2-2 line illustrated in FIG. 1.

Hereinafter, one embodiment of a centrifugal clutch according to the present invention will be described with reference to the drawings. FIG. 1 is a plan sectional view schematically illustrating a configuration of a power transmission mechanism 100 including a centrifugal clutch 200 according to the present invention. Moreover, FIG. 2 is a side view of the centrifugal clutch 200 as seen from a 2-2 line illustrated in FIG. 1. The power transmission mechanism 100 including the centrifugal clutch 200 is a mechanical device mainly provided between an engine and a rear wheel as a drive wheel in a motorcycle such as a scooter to transmit rotary drive force to the rear wheel or block such transmission while automatically changing a reduction ratio with respect to the number of rotations of the engine.

(Configuration of Centrifugal Clutch 200)

The power transmission mechanism 100 mainly includes each of a transmission 101 and the centrifugal clutch 200. The transmission 101 is a mechanical device configured to reduce speed steplessly to transmit the rotary drive force from the not-shown engine to the centrifugal clutch 200. The transmission 101 mainly includes each of a drive pulley 110, a V-belt 120, and a driven pulley 130. Of these components, the drive pulley 110 is provided on a crankshaft 111 extending from the engine, and is a mechanical device to be directly rotatably driven by the rotary drive force of the engine. The drive pulley 110 mainly includes each of a stationary drive plate 112 and a movable drive plate 113.

The stationary drive plate 112 is a component to be rotatably driven in a state in which the V-belt 120 is sandwiched and held by the stationary drive plate 112 and the movable drive plate 113. The stationary drive plate 112 is formed in such a manner that a metal material is formed into a conical tubular shape. The stationary drive plate 112 is attached onto the crankshaft 111 in a fixed manner in a state in which a raised-side surface of the stationary drive plate 112 faces a movable drive plate 113 side (an engine side). That is, the stationary drive plate 112 is constantly rotatably driven together with the crankshaft 111. Moreover, multiple radiation fins 112a are, on a recessed-side surface of the stationary drive plate 112, provided radially about the axis of the crankshaft 111.

The movable drive plate 113 is a component to be rotatably driven in a state in which the V-belt 120 is sandwiched and held by the movable drive plate 113 and the stationary drive plate 112. The movable drive plate 113 is formed in such a manner that a metal material is formed into a conical tubular shape. The movable drive plate 113 is attached to the crankshaft 111 in a state in which a raised-side surface of the movable drive plate 113 faces the stationary drive plate 112. In this case, the movable drive plate 113 is, through an impregnated bush, attached onto a sleeve bearing 114 fitted onto the crankshaft 111 in a fixed manner. The movable drive plate 113 is attached to the sleeve bearing 114 to freely slide in each of an axial direction and a circumferential direction.

On the other hand, on a recessed-side surface of the movable drive plate 113, multiple roller weights 115 are provided in a state in which the roller weights 115 are pressed by a lamp plate 116. The roller weight 115 is a component configured to displace outward in a radial direction according to an increase in the number of rotations of the movable drive plate 113 to press the movable drive plate 113 to a stationary drive plate 112 side in cooperation with the lamp plate 116. The roller weight 115 is formed in such a manner that a metal material is formed into a tubular shape. Moreover, the lamp plate 116 is a component configured to press the roller weights 115 to the movable drive plate 113 side. The lamp plate 116 is formed in such a manner that a metal plate is bent to the movable drive plate 113 side.

The V-belt 120 is a component configured to transmit rotary drive force of the drive pulley 110 to the driven pulley 130. The V-belt 120 is formed in such an endless ring shape that a core wire is covered with a resin material. The V-belt 120 is arranged between the stationary drive plate 112 and the movable drive plate 113 and between a stationary driven plate 131 and a movable driven plate 134 of the driven pulley 130, and is bridged between the drive pulley 110 and the driven pulley 130.

The driven pulley 130 is a mechanical device to be rotatably driven by the rotary drive force from the engine, the rotary drive force being transmitted through each of the drive pulley 110 and the V-belt 120. The driven pulley 130 mainly includes each of the stationary driven plate 131 and the movable driven plate 134.

The stationary driven plate 131 is a component to be rotatably driven in a state in which the V-belt 120 is sandwiched and held by the stationary driven plate 131 and the movable driven plate 134. The stationary driven plate 131 is formed in such a manner that a metal material is formed into a conical tubular shape. The stationary driven plate 131 is attached onto a driven sleeve 132 in a fixed manner in a state in which a raised-side surface of the stationary driven plate 131 faces a movable driven plate 134 side.

The driven sleeve 132 is a metal tubular component to be rotatably driven together with the stationary driven plate 131. The driven sleeve 132 is attached to a drive shaft 133 to freely rotate relative to the drive shaft 133 through a bearing. The drive shaft 133 is a metal rotary shaft body configured to drive, through the not-shown transmission, the rear wheel of the motorcycle on which the power transmission mechanism 100 is mounted. In this case, the rear wheel of the motorcycle is attached to one (the right side as viewed in the figure) end portion of the drive shaft 133.

The movable driven plate 134 is a component to be rotatably driven in a state in which the V-belt 120 is sandwiched and held by the movable driven plate 134 and the stationary driven plate 131. The movable driven plate 134 is formed in such a manner that a metal material is formed into a conical tubular shape. The movable driven plate 134 is fitted onto the driven sleeve 132 to freely slide in the axial direction in a state in which a raised-side surface of the movable driven plate 134 faces the stationary driven plate 131.

On the other hand, a torque spring 135 is, on a recessed-side surface of the movable driven plate 134, provided between such a recessed-side surface and a drive plate 210 of the centrifugal clutch 200. The torque spring 135 is a coil spring configured to elastically press the movable driven plate 134 to a stationary driven plate 131 side. That is, the transmission 101 steplessly changes the number of rotations of the engine according to a size relationship between a diameter defined by a clearance between the stationary drive plate 112 and the movable drive plate 113 and provided to sandwich the V-belt 120 and a diameter defined by a clearance between the stationary driven plate 131 and the movable driven plate 134 and provided to sandwich the V-belt 120. Moreover, the centrifugal clutch 200 is provided on each tip end side of the driven sleeve 132 and the drive shaft 133.

The centrifugal clutch 200 is a mechanical device configured to transmit the rotary drive force, which has been transmitted through the transmission 101, of the engine to the drive shaft 133 or block such transmission. The centrifugal clutch 200 mainly includes each of the drive plate 210, three clutch weights 230, and a clutch outer 240.

Figure 3:
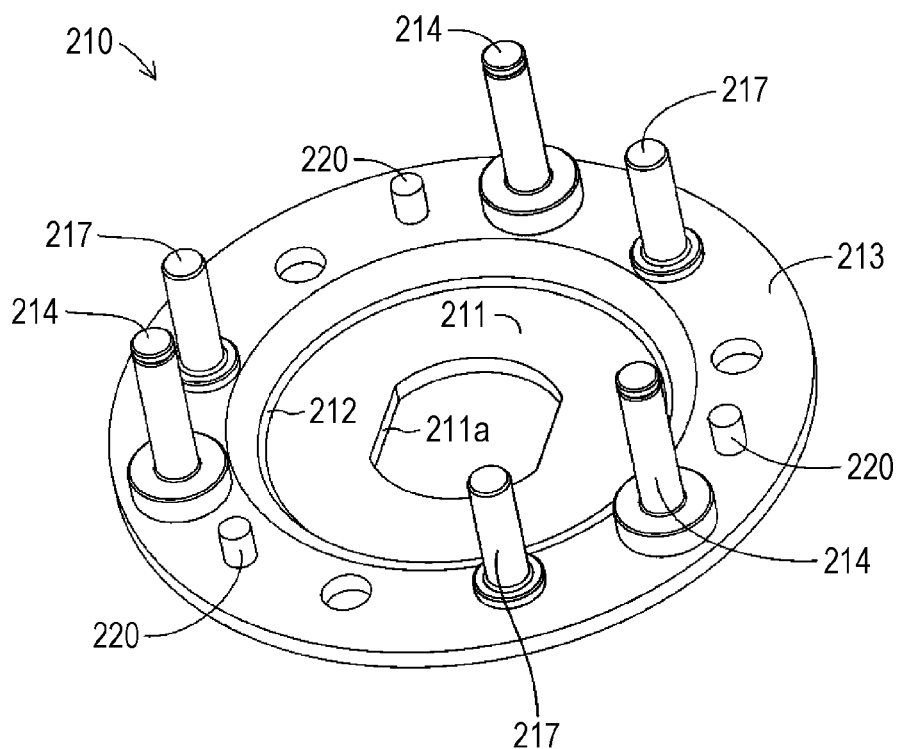
FIG. 3 is a perspective view schematically illustrating an external configuration of a drive plate in the centrifugal clutch illustrated in each of FIGS. 1 and 2.

The drive plate 210 is a component to be rotatably driven together with the driven sleeve 132. The drive plate 210 is formed in such a manner that a metal material is formed into a stepped discoid shape. More specifically, as illustrated in each of FIGS. 3 and 4, the drive plate 210 is formed with a through-hole 211a at a center portion of a flat plate-shaped bottom portion 211 such that the driven sleeve 132 penetrates the through-hole 211a, and is formed with a flange portion 213 at a tip end portion of a tube portion 212 standing at the periphery of the bottom portion 211 such that the flange portion 213 projects in a flange shape. At the flange portion 213, three swing support pins 214, three protruding body support pins 217, and three damper receiving pins 220 are provided at equal intervals along the circumferential direction.

The swing support pin 214 is a component configured to turnably support one end side of a clutch weight 230 described later to swing the other end side. The swing support pin 214 is formed as a metal stepped rod. In this case, the swing support pin 214 is attached to the flange portion 213 in a fixed manner by an attachment bolt 214a. The swing support pin 214 provides support in a state in which the swing support pin 214 penetrates a pin slide hole 231 of the clutch weight 230 through a pivot-point-side slide member 215 at an outer peripheral portion of the swing support pins 214 and a state in which the clutch weight 230 is sandwiched through each of an E-ring 214b attached to a tip end portion of the swing support pin 214 and a side plate 216 arranged between the E-ring 214b and the clutch weight 230.

The pivot-point-side slide member 215 is a component arranged between the swing support pin 214 and the pin slide hole 231 to improve slidability therebetween. The pivot-point-side slide member 215 is formed in a cylindrical shape from a resin material. The pivot-point-side slide member 215 is formed to have such inner and outer diameters that the swing support pin 214 and the pin slide hole 231 can rotatably slide relative to each other, i.e., a dimensional tolerance as a clearance fit for each of the swing support pin 214 and the pin slide hole 231.

Moreover, thermoplastic resin or thermosetting resin having thermal resistance and abrasion resistance can be used as the resin material forming the pivot-point-side slide member 215, and engineering plastic or super engineering plastic is preferable. Specifically, polyetheretherketone resin (PEEK), polyphenylene sulfide resin (PPS), polyamide-imide resin (PAI), fluorine resin (PTFE), or polyimide resin (PI) can be used as the thermoplastic resin. Diallyphthalate resin (PDAP), epoxy resin (EP), or silicon resin (SI) can be used as the thermosetting resin. The side plate 216 is a component configured to prevent three clutch weights 230 from detaching from the swing support pins 214. The side plate 216 is formed in such a manner that a metal material is formed into a ring shape.

The protruding body support pin 217 is a component configured to rotatably support a protruding body 218. The protruding body support pin 217 is formed as a metal stepped rod. With an attachment bolt 217a, the protruding body support pin 217 is, in a fixed manner, attached onto the flange portion 213 facing a tip-end-side portion of the clutch weight 230 with respect to the pin slide hole 231.

The protruding body 218 is a component configured to press the clutch weight 230 to a clutch outer 240 side. The protruding body 218 is formed in such a manner that a resin material is formed into a cylindrical shape. In this case, the protruding body 218 is formed to have such an inner diameter that the protruding body 218 can rotatably slide on the protruding body support pin 217, i.e., a dimensional tolerance as a so-called clearance fit for the protruding body support pin 217. Moreover, the resin material forming the protruding body 218 is similar to the resin material forming the pivot-point-side slide member 215.

The damper receiving pin 220 is a component configured to support a damper 221. The damper receiving pin 220 is formed as a metal rod. The damper 221 is a component configured to guide swing motion for causing the other end side of the clutch weight 230 to approach or separate from the clutch outer 240 and serving as a buffer material upon separation. The damper 221 is formed in such a manner that a rubber material is formed into a cylindrical shape. The damper 221 is fitted onto an outer peripheral surface of the damper receiving pin 220 in a fixed manner.

Figure 4:
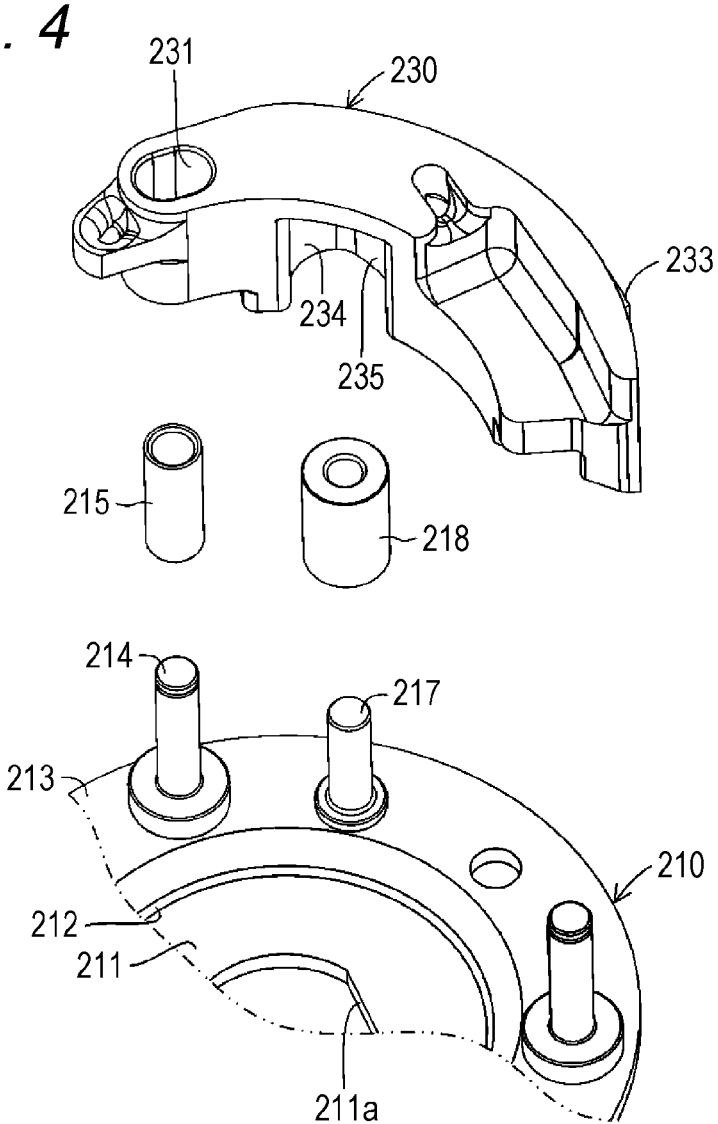
FIG. 4 is a partial exploded perspective view illustrating the state of assembly of the drive plate, a pivot-point-side slide member, a protruding body, and a clutch weight in the centrifugal clutch illustrated in each of FIGS. 1 and 2.
Figure 5:
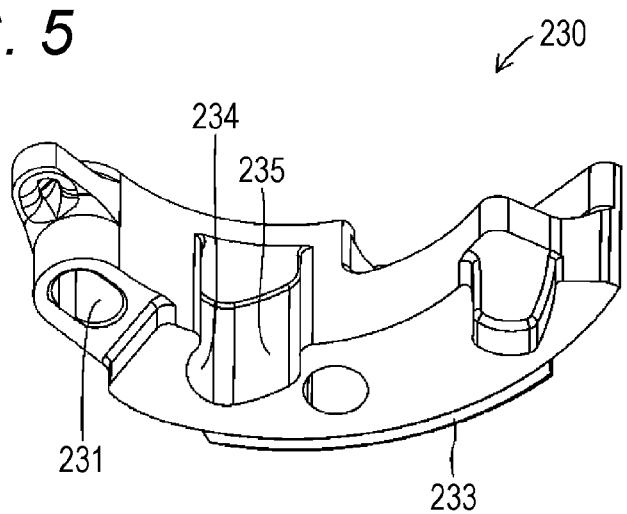
FIG. 5 is a perspective view schematically illustrating, as seen from a drive plate side, an external configuration of the clutch weight in the centrifugal clutch illustrated in each of FIGS. 1 and 2.

As illustrated in each of FIGS. 4 and 5, each of three clutch weights 230 is a component configured to contact or separate from the clutch outer 240 through a clutch shoe 233 according to the number of rotations of the drive plate 210 to transmit the rotary drive force from the engine to the drive shaft 133 or block such transmission. The clutch weight 230 is formed in such a manner that a metal material (e.g., a zinc material) is formed into a curved shape extending along the circumferential direction of the drive plate 210.

In each of these clutch weights 230, the other end side is coupled to adjacent one of the clutch weights 230 by a coupling spring 232 in a state in which one end side is turnably supported by the swing support pin 214 and the pivot-point-side slide member 215 through the pin slide hole 231. The other end side is pulled in an inward direction of the drive plate 210. That is, the clutch weight 230 is supported on the drive plate 210 through each of the swing support pin 214, the pivot-point-side slide member 215, and the pin slide hole 231 in a state in which the other end side provided with the clutch shoe 233 is swingable relative to the clutch outer 240.

Note that for the sake of simplicity in description of a configuration of the clutch weight 230, FIG. 2 illustrates surfaces, which are cut in different thickness directions, of two spots at one of three clutch weights 230. Moreover, FIG. 2 does not show each of the E-ring 214b and the side plate 216. Further, FIG. 2 illustrates, by a dashed arrow, each of rotary drive directions of the drive plate 210 and the clutch outer 240 in the centrifugal clutch 200.

The pin slide hole 231 is a portion in which the swing support pin 214 of the drive plate 210 is turnably and slidably fitted through the pivot-point-side slide member 215. The pin slide hole 231 is formed as a through-hole penetrating the clutch weight 230 in the thickness direction thereof. The pin slide hole 231 is formed in a long hole shape such that one end side of the clutch weight 230 displaces backward in the rotary drive direction of the drive plate 210 when the clutch shoe 233 contacts the clutch outer 240.

In this case, a long hole forming the pin slide hole 231 is formed such that a length in one direction is longer than that in a width direction perpendicular to the one direction and the entirety of the long hole extends long and thin. More specifically, the pin slide hole 231 is formed to have an inner diameter as a clearance fit slightly larger than the outer diameter of the pivot-point-side slide member 215 in the width direction as the radial direction of the drive plate 210. On the other hand, a longitudinal direction of the pin slide hole 231 extends in an arc shape or a linear shape in such a direction that displacement of the clutch weight 230 to a side on which pressing of a driven portion 235 of the clutch weight 230 against the protruding body 218 is increased and climbing is more promoted is allowed.

In the present embodiment, the pin slide hole 231 is formed to extend in an arc shape to the front side in the rotary drive direction of the drive plate 210. In this case, in the present embodiment, the pin slide hole 231 is formed along an arc about the center of rotation of the drive plate 210. The pin slide hole 231 may be formed along an arc about other positions.

The clutch shoe 233 is a component configured to increase friction force for an inner peripheral surface of the clutch outer 240. The clutch shoe 233 is formed in such a manner that a friction material is formed into a plate shape extending in an arc shape. The clutch shoe 233 is provided on an outer peripheral surface of each clutch weight 230 on a tip end side opposite to the pin slide hole 231.

Moreover, each of protruding body reliefs 234 in a shape recessed to cover the protruding bodies 218 is formed at a portion of an inner peripheral surface of the clutch weight 230 facing the protruding body 218 of the drive plate 210. At part of an inner peripheral portion of the protruding body relief 234, the driven portion 235 constantly contacting the protruding body 218 is formed. The remaining part is cut in an arc shape not to contact the protruding body 218.

The driven portion 235 is a portion for displacing the clutch weight 230 to the clutch outer 240 side in cooperation with the protruding body 218. The driven portion 235 includes a flat inclined surface facing the rear side in the rotary drive direction of the drive plate 210. More specifically, the driven portion 235 is formed to extend inclined toward an outer rear side in the rotary drive direction of the drive plate 210. Moreover, the thickness of the driven portion 235 is greater than the thickness of the protruding body 218.

The clutch outer 240 is a component to be rotatably driven together with the drive shaft 133. The clutch outer 240 is formed in such a manner that a metal material is formed into a cup shape covering the outer peripheral surface of the clutch weight 230 from the drive plate 210. That is, the clutch outer 240 has a cylindrical surface 241 configured to friction-contact the clutch shoe 233 of the clutch weight 230 displaced to an outer peripheral side of the drive plate 210.

(Operation of Centrifugal Clutch 200)

Next, operation of the centrifugal clutch 200 configured as described above will be described with reference to FIGS. 6 to 10. Note that in FIGS. 6 to 10, the E-ring 214b, the side plate 216, and the coupling spring 232 are not shown. Moreover, in FIGS. 7 to 10, the rotary drive directions of the drive plate 210, the clutch outer 240, and the protruding body 218 in the centrifugal clutch 200 are each indicated by dashed arrows.

Figure 6:
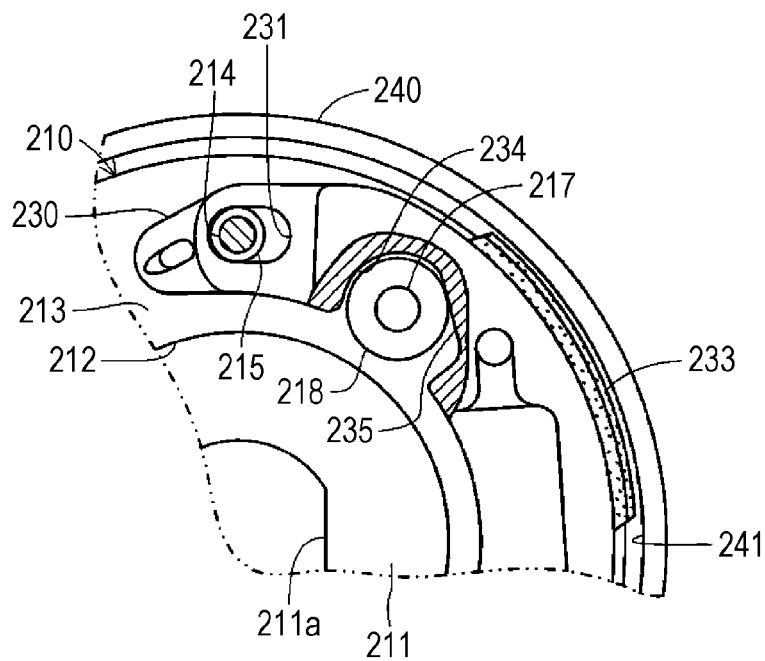
FIG. 6 is a partially-enlarged view illustrating a disconnection state in which a clutch shoe does not contact a clutch outer in the centrifugal clutch illustrated in FIG. 2.

The centrifugal clutch 200 functions as part of the power transmission mechanism 100 arranged between the engine and the rear wheel as the drive wheel in the motorcycle (e.g., the scooter). First, in a case where the engine is in an idling state, the centrifugal clutch 200 blocks transmission of the drive force between the engine and the drive shaft 133 as illustrated in FIG. 6. Specifically, in the centrifugal clutch 200, the drive plate 210 is rotatably driven and the clutch weight 230 is rotatably driven by the rotary drive force of the engine transmitted through the transmission 101.

However, in this case, in the centrifugal clutch 200, centrifugal force acting on the clutch weight 230 is smaller than elastic force (pull force) of the coupling spring 232. Thus, the clutch shoes 233 do not contact the cylindrical surface 241 of the clutch outer 240, and therefore, the rotary drive force of the engine is not transmitted to the drive shaft 133. Moreover, in this case, the driven portion 235 maintains a state in which the driven portion 235 is pressed to contact a roller surface of the protruding body 218 by the elastic force (the pull force) of the coupling spring 232.

Then, the clutch weight 230 is pulled by the pull force of one of two coupled coupling springs 232 that pulls from a position far from the swing support pin 214 (the coupling spring 232 hooked at a position adjacent to the driven portion 235). In this case, the pin slide hole 231 is formed in the long hole shape, and therefore, the clutch weight 230 displaces to the side of the coupling spring 232 hooked at the position adjacent to the driven portion 235. With this configuration, the swing support pin 214 is positioned at a rear end portion of the pin slide hole 231 in the rotary drive direction of the drive plate 210 (see FIG. 6).

Figure 7:
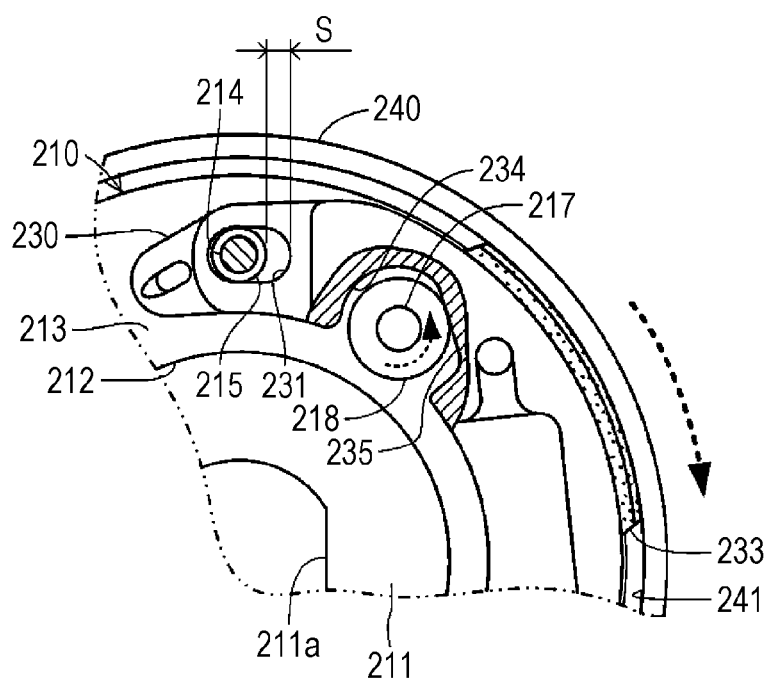
FIG. 7 is a partially-enlarged view illustrating a coupling state in which the clutch shoe contacts the clutch outer with no abrasion of the clutch shoe in the centrifugal clutch illustrated in FIG. 6.

On the other hand, the centrifugal clutch 200 transmits the rotary drive force of the engine to the drive shaft 133 according to an increase in the number of rotations of the engine by driver's accelerator operation in the motorcycle. Specifically, in the centrifugal clutch 200, the centrifugal force acting on the clutch weight 230 becomes greater than the elastic force (the pull force) of the coupling spring 232 as the number of rotations of the engine increases, as illustrated in FIG. 7. Thus, the clutch weight 230 turnably displaces outward in the radial direction about the swing support pin 214.

That is, in the centrifugal clutch 200, the clutch weight 230 turnably displaces to a cylindrical surface 241 side of the clutch outer 240 against the elastic force (the pull force) of the coupling spring 232 as the number of rotations of the engine increases. As a result, the clutch shoe 233 contacts the cylindrical surface 241. In this case, the swing support pin 214 and the pin slide hole 231 slide on each other through the resin pivot-point-side slide member 215, and therefore, the clutch weight 230 can smoothly turnably displace.

In a case where the clutch shoe 233 contacts the cylindrical surface 241, the clutch weight 230 receives reactive force in the opposite direction of the rotary drive direction through the clutch shoe 233. In this case, the pin slide hole 231 is formed in the long hole shape along the circumferential direction of the drive plate 210, and the swing support pin 214 is positioned at the rear end portion of the pin slide hole 231 in the rotary drive direction of the drive plate 210. That is, the clutch weight 230 is in a state in which backward displacement in the rotary drive direction of the drive plate 210 is allowed. Thus, the clutch weight 230 relatively displaces in the opposite direction of the rotary drive direction of the drive plate 210 by the reactive force received through the clutch shoe 233. In this case, the swing support pin 214 and the pin slide hole 231 also slide on each other through the resin pivot-point-side slide member 215, and therefore, the clutch weight 230 can smoothly displace.

Accordingly, the driven portion 235 formed at the clutch weight 230 is strongly pressed against the protruding body 218. In this case, the protruding body 218 is rotatably supported on the protruding body support pin 217. Thus, the protruding body 218 rotates counterclockwise as viewed in the figure by pressing by the driven portion 235. Thus, in the clutch weight 230, the clutch shoe 233 is pushed to the clutch outer 240 side on the outside in the radial direction and is pressed against the cylindrical surface 241 as the driven portion 235 climes on the protruding body 218 while rotatably displacing the protruding body 218. In this case, the protruding body 218 is made of the resin material, and therefore, the protruding body 218 can smoothly rotatably displace as compared to a case where both components are made of a metal material.

As a result, in the centrifugal clutch 200, after the clutch shoes 233 have contacted the cylindrical surface 241 of the clutch outer 240, the clutch shoes 233 are pressed against the cylindrical surface 241 in extremely-short time (in other words, instantaneously). Thus, the centrifugal clutch 200 is brought into a coupling state in which the rotary drive force of the engine is fully transmitted to the drive shaft 133. That is, the clutch weight 230 is brought into a state in which the clutch weight 230 enters a portion between the protruding body 218 and the clutch outer 240 in a wedge manner.

In this case, the pin slide hole 231 is formed with such a length that contact with the swing support pin 214 is avoided in a state in which the clutch weight 230 enters the portion between the protruding body 218 and the clutch outer 240 in the wedge manner. That is, in the pin slide hole 231, a clearance S is ensured between the pin slide hole 231 and the pivot-point-side slide member 215 even in a state in which the clutch weight 230 enters the portion between the protruding body 218 and the clutch outer 240 in the wedge manner. This prevents interference with entrance of the clutch weight 230 into the portion between the protruding body 218 and the clutch outer 240.

In this coupling state, the centrifugal clutch 200 maintains a state in which the clutch shoes 233 are pressed against the cylindrical surface 241 of the clutch outer 240. Thus, the drive plate 210 and the clutch outer 240 are rotatably driven together. With this configuration, the rear wheel of the motorcycle is rotatably driven by the rotary drive force of the engine so that the motorcycle can run.

On the other hand, in a case where the number of rotations of the engine decreases, the centrifugal clutch 200 blocks transmission of the rotary drive force of the engine to the drive shaft 133. Specifically, in the centrifugal clutch 200, the centrifugal force acting on the clutch weight 230 becomes smaller than the elastic force (the pull force) of the coupling spring 232 as the number of rotations of the engine decreases. Thus, the clutch weight 230 turnably displaces inward in the radial direction about the swing support pin 214.

Figure 8:
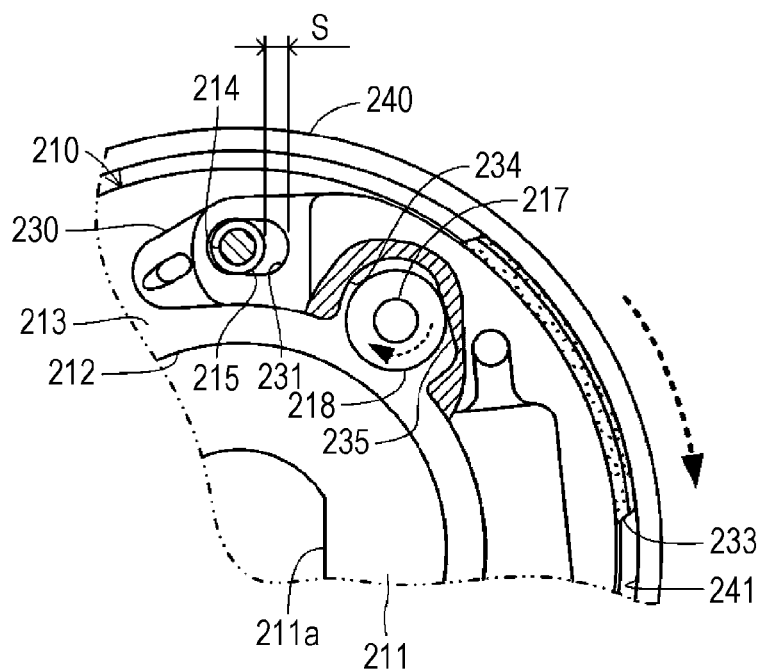
FIG. 8 is a partially-enlarged view illustrating a state in which the clutch weight tilts inward in a radial direction of the drive plate in the centrifugal clutch illustrated in FIG. 7.
Figure 9:
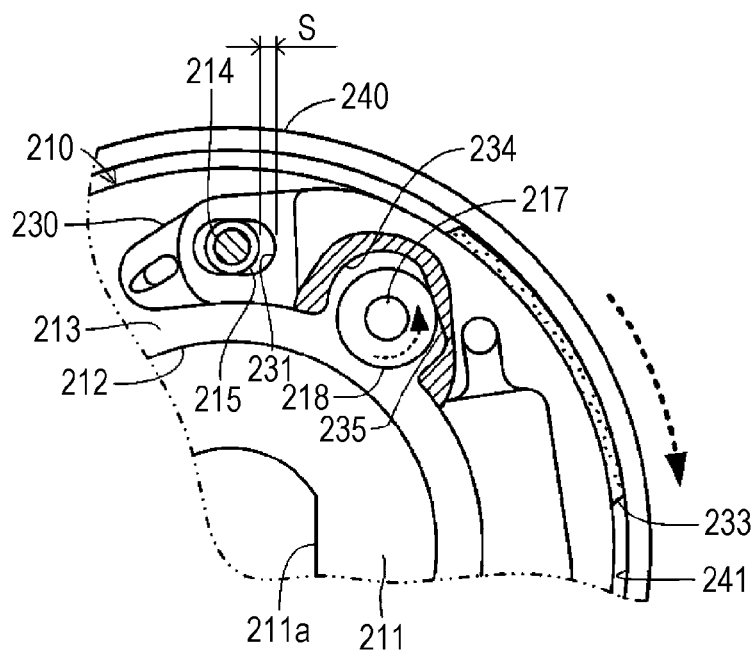
FIG. 9 is a partially-enlarged view illustrating a coupling state in which the clutch shoe contacts the clutch outer with an abrasion of about 1 mm being caused at the clutch shoe in the centrifugal clutch illustrated in FIG. 6.
Figure 10:
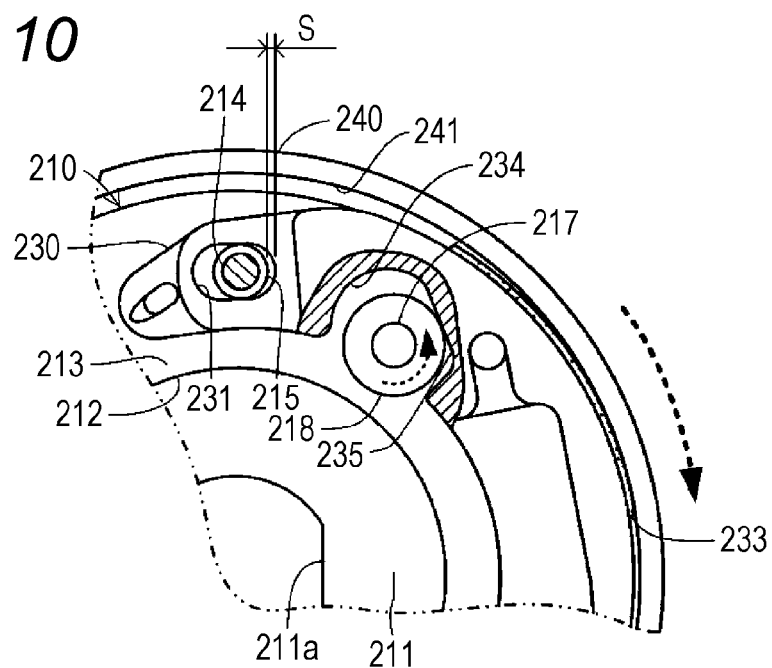
FIG. 10 is a partially-enlarged view illustrating a coupling state in which the clutch shoe contacts the clutch outer with an abrasion of about 2 mm being caused at the clutch shoe in the centrifugal clutch illustrated in FIG. 6.

In this case, as illustrated in FIG. 8, the pin slide hole 231 is formed in the long hole shape along the circumferential direction of the drive plate 210, and the swing support pin 214 is positioned on the front side with respect to the rear end portion of the pin slide hole 231 in the rotary drive direction of the drive plate 210. That is, the clutch weight 230 is in a state in which forward displacement in the rotary drive direction of the drive plate 210 is allowed. Thus, the clutch weight 230 rotatably displaces relative to the drive plate toward the front in the rotary drive direction of the drive plate 210 by the elastic force (the pull force) of the coupling spring 232. In this case, the clutch weight 230 displaces while the driven portion 235 is rotatably displacing the protruding body 218 clockwise as viewed in the figure.

Accordingly, the clutch weight 230 returns to an original position (a position upon idling as described above). That is, the centrifugal clutch 200 is brought into a disconnection state in which the clutch shoes 233 do not contact the clutch outer 240 and no rotary drive force is transmitted. Moreover, the clutch weight 230 displaces to the side of one of two coupled coupling springs 232 that pulls from the position far from the swing support pin 214 (the coupling spring 232 hooked at the position adjacent to the driven portion 235).

Thus, the swing support pin 214 is positioned at the rear end portion of the pin slide hole 231 in the rotary drive direction of the drive plate 210 (see FIG. 6). Even in such a case where the number of rotations of the engine decreases, the clutch weight 230 can smoothly turnably displace by the resin pivot-point-side slide member 215 and the resin protruding body 218.

Moreover, even in a case where the thickness of the clutch shoe 233 decreases due to abrasion, the centrifugal clutch 200 can be brought into the coupling state in such a manner that the clutch shoes 233 are quickly pressed against the cylindrical surface 241 of the clutch outer 240. That is, in the centrifugal clutch 200, the protruding body 218 is rotatably attached to the protruding body support pin 217 as illustrated in each of FIGS. 9 and 10. Thus, even in a case where the clutch shoe 233 is abraded, the amount of rotary displacement of the protruding body 218 increases by an amount corresponding to such an abrasion amount. Consequently, the force of pressing the clutch shoe 233 against the cylindrical surface 241 of the clutch outer 240 is maintained.

Further, in this case, the pin slide hole 231 is formed with such a length that even in a case where the clutch weight 230 enters the portion between the protruding body 218 and the clutch outer 240 in the wedge manner by the amount corresponding to the abrasion amount of the clutch shoe 233, the clearance S for avoiding contact with the pivot-point-side slide member 215 is ensured. Thus, the pin slide hole 231 does not interfere with entrance of the clutch weight 230 into the portion between the protruding body 218 and the clutch outer 240 even in a case where the clutch weight 230 enters the portion between the protruding body 218 and the clutch outer 240 in the wedge manner by the amount corresponding to the abrasion amount of the clutch shoe 233.

As can be understood from operation description above, the drive plate 210 and the clutch weights 220 are, according to the above-described embodiment, coupled through the long-hole-shaped pin slide holes 231 and the swing support pins 214 slidably fitted to each other in the centrifugal clutch 200. Thus, the drive plate 210 is rotatably driven such that the clutch shoe 233 contacts the clutch outer 240, and in this manner, the clutch weight 230 shifts to the rear side in the rotary drive direction, the driven portion 235 climbs on the protruding body 218, and the clutch shoe 233 quickly presses the clutch outer 240. That is, since the clutch shoes 233 can be strongly pressed against the clutch outer 240 even with one drive plate 210, the centrifugal clutch 200 can increase a clutch capacity with a simple configuration.

Further, implementation of the present invention is not limited to the above-described embodiment, and various changes can be made without departing from the gist of the present invention. Note that in each of the following variations, the same reference numerals are used to represent components similar to those of the above-described embodiment, and description thereof will be omitted. Moreover, FIGS. 12 and 14 of FIGS. 11 to 14 illustrating each variation do not show the E-ring 214b, the side plate 216, and the coupling spring 232, and illustrate, by a dashed arrow, each of the rotary drive directions of the drive plate 210, the clutch outer 240, and the protruding body 218 in the centrifugal clutch 200.

For example, in the above-described embodiment, the centrifugal clutch 200 is configured such that the swing support pins 214 are provided at the drive plate 210 and the pin slide holes 231 are provided at the clutch weights 230. However, one of the swing support pin 214 or the pin slide hole 231 may be provided at the drive plate 210 or the clutch weight 230, and the other one of the swing support pin 214 or the pin slide hole 231 may be provided at the clutch weight 230 or the drive plate 210. Thus, the centrifugal clutch 200 can be also configured such that the swing support pins 214 are provided at the clutch weights 230 and the pin slide holes 231 are provided at the drive plate 210.

Moreover, in the above-described embodiment, the pin slide hole 231 is formed as the arc-shaped through-hole. However, it is enough to form the pin slide hole 231 as the long hole allowing backward displacement of the clutch weight 230 in the rotary drive direction of the drive plate 210 in a state (see FIG. 6) in which the clutch shoe 233 of the clutch weight 230 is most separated from the cylindrical surface 241 of the clutch outer 240. Thus, the pin slide hole 231 is not limited to that of the above-described embodiment.

Thus, the pin slide hole 231 can be formed in a linear shape extending in a tangential direction perpendicular to the radial direction of the drive plate 210. Alternatively, the pin slide hole 231 can be also formed as a so-called blind hole opening on one side and closed on the other side.

Further, in the above-described embodiment, the pin slide hole 231 is formed as the long hole with such a length that the clearance S for avoiding collision with the swing support pin 214 through the pivot-point-side slide member 215 is ensured even in a case where the clutch weight 230 displaces to the rear side in the rotary drive direction of the drive plate 210. With this configuration, when the clutch weight 230 displaces backward in the rotary drive direction of the drive plate 210, the driven portion 235 can sufficiently climb on the protruding body 218 in the centrifugal clutch 200. Thus, the clutch shoe 233 can be strongly pressed by the clutch outer 240.

However, the pin slide hole 231 can be also formed as a long hole with such a length that the pin slide hole 231 collides with the swing support pin 214 through the pivot-point-side slide member 215 in a case where the clutch weight 230 displaces to the rear side in the rotary drive direction of the drive plate 210. According to such a configuration, in the centrifugal clutch 200, when the clutch weight 230 displaces backward in the rotary drive direction of the drive plate 210, climbing of the driven portion 235 on the protruding body 218 is restricted by collision of the swing support pin 214 with an end portion of the pin slide hole 231 through the pivot-point-side slide member 215. Thus, the pressing force of the clutch shoe 233 against the clutch outer 240 can be restricted.

Moreover, in the above-described embodiment, the pivot-point-side slide member 215 is formed in the cylindrical shape from the resin material, and is rotatably slidably provided at the outer peripheral portion of the swing support pin 214. In other words, the pivot-point-side slide member 215 is configured to function as a roller for the swing support pin 214. However, it is enough to provide the pivot-pointside slide member 215 between the swing support pin 214 and the pin slide hole 231 to slidably displace these components.

Thus, the pivot-point-side slide member 215 can be made of other materials than the resin material, such as a metal material. In this case, the pivot-point-side slide member 215 may be made of the same material as that of the swing support pin 214 or the pin slide hole 231, or may be made of a material different from that of the swing support pin 214 or the pin slide hole 231. In this case, the pivot-point-side slide member 215 is made of a more-easily-abradable material than the material(s) forming the swing support pin 214 and/or the pin slide hole 231, and therefore, abrasion of the swing support pin 214 and/or the pin slide hole 231 can be reduced. Alternatively, the pivot-point-side slide member 215 is made of a material (e.g., an aluminum material) having better slidability than that of the material(s) forming the swing support pin 214 and/or the pin slide hole 231, and therefore, the slidability between the swing support pin 214 and the pin slide hole 231 can be improved. Alternatively, the pivot-point-side slide member 215 can be also made of a material (e.g., a metal material or a ceramic material) having thermal resistance and abrasion resistance.

Further, the pivot-point-side slide member 215 can be provided in a non-rotatable non-slidable fixed state at the outer peripheral portion of the swing support pin 214. In this case, the pivot-point-side slide member 215 may be formed in a tubular shape fitted onto the swing support pin 214. Alternatively, a cutout portion can be formed at the swing support pin 214, and the pivot-point-side slide member 215 can be formed in a plate shape fitted in such a cutout portion and extending in a planar shape or an arc shape. In addition, the pivot-point-side slide member 215 can be also formed by resin material insert molding for the cutout portion formed at the swing support pin 214. Moreover, one of the swing support pin 214 itself or the pin slide hole 231 itself can be also made of a resin material. Note that the pivot-point-side slide member 215 is rotatably slidably formed at the outer peripheral portion of the swing support pin 214 so that the pivot-point-side slide member 215 can be easily assembled with the swing support pin 214 and slide resistance can be reduced.

Figure 11:
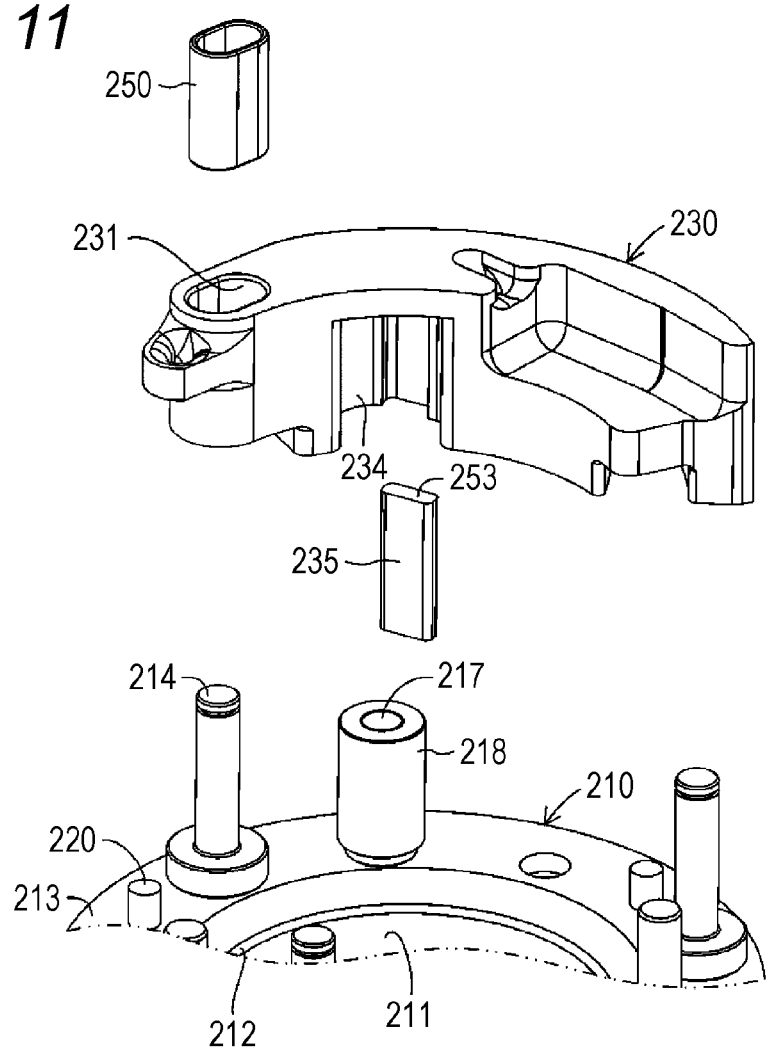
FIG. 11 is a partial exploded perspective view illustrating the state of assembly of a drive plate, a pivot-point-side slide member, a protruding body, a swing-side slide member, and a clutch weight in a centrifugal clutch according to a variation of the present invention.
Figure 12:
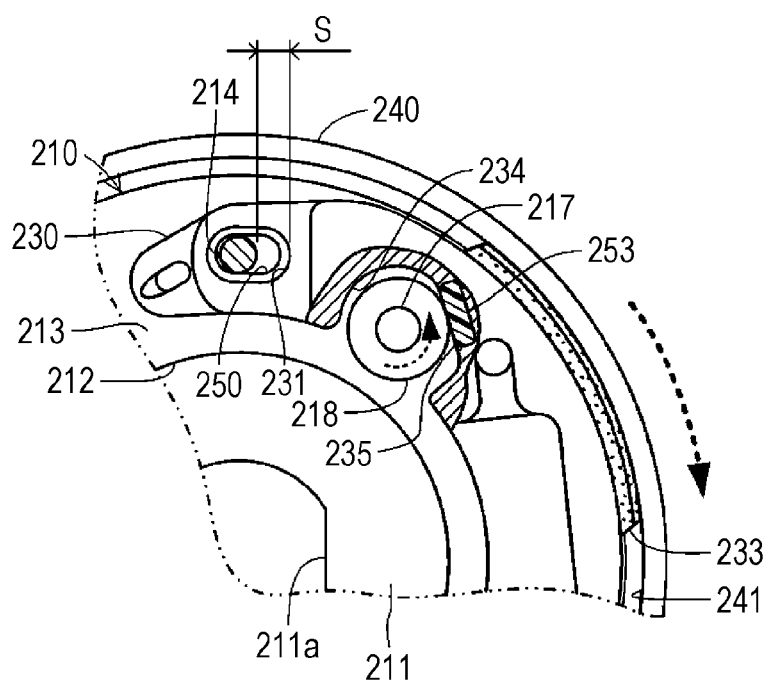
FIG. 12 is a side view of the centrifugal clutch illustrated in FIG. 11 as seen from the 2-2 line illustrated in FIG. 1.
Figure 13:
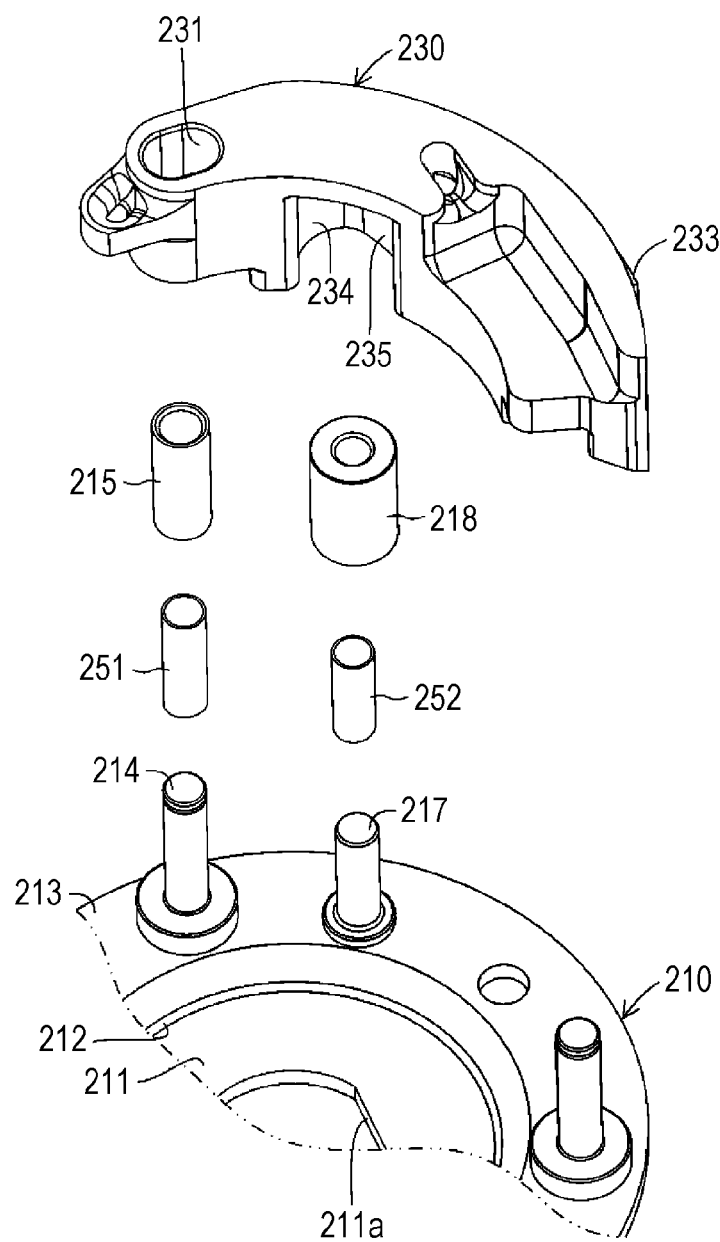
FIG. 13 is a partial exploded perspective view illustrating the state of assembly of a drive plate, a pivot-point-side slide member, an auxiliary pivot-point-side slide member, a protruding body, an auxiliary swing-side slide member, and a clutch weight in a centrifugal clutch according to another variation of the present invention.
Figure 14:
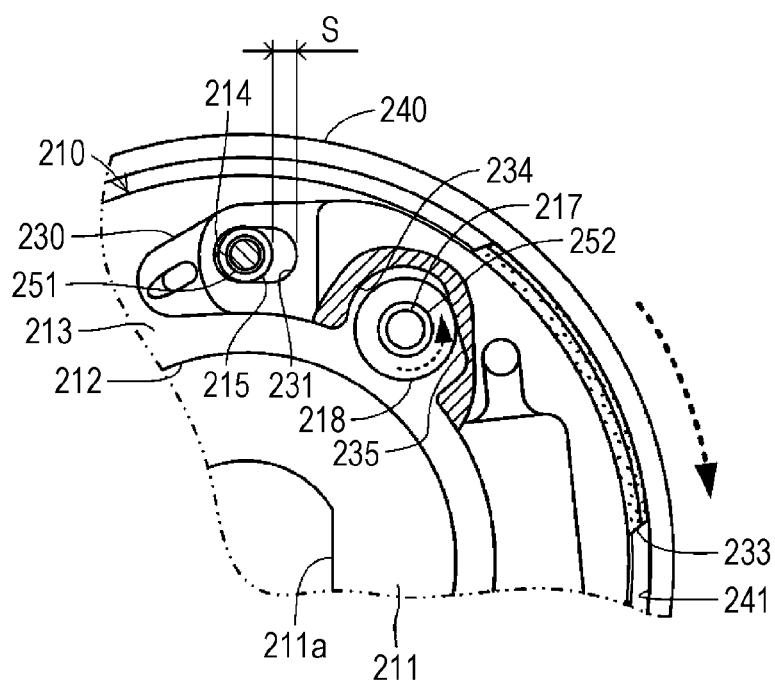
FIG. 14 is a side view of the centrifugal clutch illustrated in FIG. 13 as seen from the 2-2 line illustrated in FIG. 1.

Moreover, the pivot-point-side slide member 215 can be also provided at the pin slide hole 231 in addition to or instead of the swing support pin 214. For example, as illustrated in FIGS. 11 and 12, a pivot-point-side slide member 250 can be formed in a long tubular shape fitted in the inner peripheral surface of the pin slide hole 231. In this case, an inner peripheral portion of the pivot-point-side slide member 250 is formed with such a size that the swing support pin 214 can slide in the pivot-point-side slide member 250.

Further, the pivot-point-side slide member 215 may be directly provided on the swing support pin 214. As illustrated in each of FIGS. 13 and 14, the pivot-point-side slide member 215 can be also provided at the swing support pin 214 through an auxiliary pivot-point-side slide member 251. The auxiliary pivot-point-side slide member 251 is a component provided between the swing support pin 214 and the pivot-point-side slide member 215 to slide these components. The auxiliary pivot-point-side slide member 251 is formed as a cylindrical body similar to the pivot-point-side slide member 215. In this case, the auxiliary pivot-point-side slide member 251 may be made of the same resin material as that of the pivot-point-side slide member 215, or can be also made of a material (e.g., a metal material) different from that of the pivot-point-side slide member 215. In addition, the auxiliary pivot-point-side slide member 251 may be formed rotatably slidably on the pivot-point-side slide member 215, and on the other hand, may be provided rotatably slidably or non-rotatably non-slidably on the swing support pin 214. According to such a configuration, the centrifugal clutch 200 can improve slidability between the swing support pin 214 and the pivot-point-side slide member 215, and can more smoothly turn and displace the clutch weight 230 relative to the clutch outer 240. Note that the auxiliary pivot-point-side slide member 251 can be also provided non-rotatably non-slidably on the pivot-point-side slide member 215. Moreover, two or more auxiliary pivot-point-side slide members 251 may be provided in an overlapping state.

In addition, in the above-described embodiment, the protruding body 218 is formed in the cylindrical shape from the resin material, and is rotatably slidably provided at an outer peripheral portion of the protruding body support pin 217. In other words, the protruding body 218 is formed as a roller configured to rotatably slide on the protruding body support pin 217. However, it is enough to form the protruding body 218 to project outward from an outer peripheral portion of the drive plate 210 and to form the protruding body 218 in such a shape that the protruding body 218 pushes out the clutch weight 230 through the driven portion 235.

That is, it is enough to form the protruding body 218 and the driven portion 235 such that at least one of these components extends outward of the drive plate 210 toward the rear side in the rotary drive direction of the drive plate 210. In this case, it is enough that portions of the protruding body 218 and the driven portion 235 extending outward of the drive plate 210 toward the rear side in the rotary drive direction of the drive plate 210 are formed as the entirety or part of the protruding body 218 and the driven portion 235.

Thus, the protruding body 218 can be made of other materials than the resin material, such as a metal material (e.g., carbon steel, an iron-based sintered material, or an aluminum material). In this case, the protruding body 218 may be made of the same material as that of the protruding body support pin 217 or the driven portion 235, or may be made of a material different from that of the protruding body support pin 217 or the driven portion 235. Alternatively, the protruding body 218 is made of a more-easily-abradable material than the material(s) forming the protruding body support pin 217 and/or the driven portion 235, and therefore, abrasion of the protruding body support pin 217 and/or the driven portion 235 can be reduced. Alternatively, the protruding body 218 is made of a material (e.g., an aluminum material) having better slidability than that of the material(s) forming the protruding body support pin 217 and/or the driven portion 235, and therefore, slidability between the protruding body support pin 217 and the driven portion 235 can be improved. Alternatively, the protruding body 218 can be also made of a material (e.g., a metal material or a ceramic material) having thermal resistance and abrasion resistance.

Moreover, the protruding body 218 can be provided in a non-rotatable non-slidable fixed state at the outer peripheral portion of the protruding body support pin 217. In this case, the protruding body 218 may be formed in a tubular shape fitted onto the protruding body support pin 217. Alternatively, a cutout portion can be formed at the protruding body support pin 217, and the protruding body 218 can be formed in a plate shape fitted in such a cutout portion and extending in a planar shape or an arc shape. Moreover, the protruding body 218 can be also formed by resin material insert molding for the cutout portion formed at the protruding body support pin 217.

Further, in a case where the protruding body 218 is provided in a fixed manner on the drive plate 210, the protruding body 218 may be made of the same material integrally with the drive plate 210. In this case, the protruding body 218 may include, in an area where the driven portion 235 slides, a curved surface having an arc surface with one curvature or two or more curvatures. Moreover, each of the number of protruding bodies 218 and the number of driven portions 235 at the drive plate 210 and the clutch weights 230 may be at least one, i.e., one or more pairs may be provided. Note that the protruding body 218 is formed rotatably slidably at the outer peripheral portion of the protruding body support pin 217. Thus, the protruding body 218 can be easily assembled with the protruding body support pin 217, and can reduce slide resistance.

In addition, the protruding body 218 may be directly provided on the protruding body support pin 217. As illustrated in each of FIGS. 13 and 14, the protruding body 218 can be also provided at the protruding body support pin 217 through an auxiliary swing-side slide member 252. The auxiliary swing-side slide member 252 is a component provided between the protruding body support pin 217 and the protruding body 218 to slide both of these components. The auxiliary swing-side slide member 252 is formed as a cylindrical body similar to the auxiliary pivot-point-side slide member 251. In this case, the auxiliary swing-side slide member 252 may be made of the same material as that of the protruding body 218, or may be made of a material (e.g., a metal material) different from that of the protruding body 218. Moreover, the auxiliary swing-side slide member 252 may be formed rotatably slidably on the protruding body 218, and on the other hand, may be provided rotatably slidably or non-rotatably non-slidably on the protruding body support pin 217. According to such a configuration, the centrifugal clutch 200 can improve slidability between the protruding body support pin 217 and the protruding body 218, and can more smoothly turn and displace the clutch weight 230 relative to the clutch outer 240. Note that the auxiliary swing-side slide member 252 can be also provided non-rotatably non-slidably on the protruding body 218.

Moreover, the protruding body 218 can be also formed in a plate shape instead of a roller shape. In this case, the driven portion 235 can be also formed in a rotatable roller shape or formed as a curved plate-shaped body provided non-rotatably in a fixed state.

Further, in the above-described embodiment, in the centrifugal clutch 200, the protruding body 218 is made of the resin material, and the driven portion 235 is made of the metal material. However, in the centrifugal clutch 200, the protruding body 218 and the driven portion 235 can be also made of the same material instead of these different materials. In this case, in the centrifugal clutch 200, one of portions of the protruding body 218 and the driven portion 235 sliding on each other may be made of the metal material, and the other one of these portions may be made of the resin material.

Thus, in the centrifugal clutch 200, the protruding body 218 can be made of the metal material, and the driven portion 235 can be made of the resin material. In this case, in the centrifugal clutch 200, the driven portion 235 can be, as illustrated in each of FIGS. 11 and 12, formed in such a manner that a swing-side slide member 253 formed in a plate shape from a resin material is embedded in a portion of the clutch weight 230 facing the protruding body 218. The swing-side slide member 253 can be formed in a planar shape or a curved shape.

Moreover, in the above-described embodiment, in the centrifugal clutch 200, the pivot-point-side slide member 215 made of a resin material is provided between the swing support pin 214 and the pin slide hole 231. Further, of the protruding body 218 and the driven portion 235, the protruding body 218 is made of resin material. With this configuration, in the centrifugal clutch 200, slidability of the clutch weight 230 can be enhanced, and swing of the clutch weight 230 relative to the clutch outer 240 can be easily performed. In this case, according to an experiment by the inventor(s) of the present invention, the following has been confirmed. That is, the centrifugal clutch 200 can also enhance the slidability of the clutch weight 230 and easily perform swing of the clutch weight 230 relative to the clutch outer 240 in such a manner that the centrifugal clutch 200 is configured such that the pivot-point-side slide member 215 is provided between the swing support pin 214 and the pin slide hole 231 and one of the protruding body 218 or the driven portion 235 is made of resin material.

Thus, in the centrifugal clutch 200, the pivot-point-side slide member 215 can be provided between the swing support pin 214 and the pin slide hole 231, and the protruding body 218 and the driven portion 235 can be made of the same type of metal material or different types of metal materials. Moreover, in the centrifugal clutch 200, the swing support pin 214 and the pin slide hole 231 can be directly fitted to each other without providing the pivot-point-side slide member 215 therebetween, and one of the protruding body 218 or the driven portion 235 can be made of the resin material. In this case, in the centrifugal clutch 200, the swing support pin 214 and the pin slide hole 231 can be made of the same type of metal material or different types of metal materials, and one of the protruding body 218 or the driven portion 235 can be made of the resin material.

LIST OF REFERENCE SIGNS

S Clearance
100 Power transmission mechanism
101 Transmission
110 Drive pulley
111 Crankshaft
112 Stationary drive plate
112a Radiation fin
113 Movable drive plate
114 Sleeve bearing
115 Roller weight
116 Lamp plate
120 V-belt
130 Driven pulley
131 Stationary driven plate
132 Driven sleeve
133 Drive shaft
134 Movable driven plate
135 Torque spring
200 Centrifugal clutch
210 Drive plate
211 Bottom portion
211a Through-hole
212 Tube portion
213 Flange portion
214 Swing support pin
214a Attachment bolt
214b E-ring 215 Pivot-point-side slide member
216 Side plate
217 Protruding body support pin
217a Attachment bolt
218 Protruding body
220 Damper receiving pin
221 Damper
230 Clutch weight
231 Pin slide hole
232 Coupling spring
233 Clutch shoe
234 Protruding body relief
235 Driven portion
240 Clutch outer
241 Cylindrical surface
250 Pivot-point-side slide member
251 Auxiliary pivot-point-side slide member
252 Auxiliary swing-side slide member
253 Swing-side slide member

The invention claimed is:

1. A centrifugal clutch comprising:
a drive plate to be rotatably driven together with a driven pulley in response to drive force of an engine;
a clutch outer having, outside the drive plate, a cylindrical surface provided concentrically with the drive plate;
a clutch weight having a clutch shoe formed to extend along a circumferential direction of the drive plate and facing the cylindrical surface of the clutch outer, one end side of the clutch weight in the circumferential direction being turnably attached onto the drive plate through a swing support pin and a pin slide hole, the other end side displacing toward a cylindrical surface side of the clutch outer;
a protruding body provided to protrude toward the clutch weight from the drive plate;
a driven portion provided at the clutch weight and configured to climb on the protruding body upon displacement of the other end side of the clutch weight; and
a pivot-point-side slide member provided between the swing support pin and the pin slide hole, wherein
the swing support pin is provided at the drive plate, and is formed to extend toward the clutch weight, and
the pin slide hole is provided at the clutch weight and is formed in a long hole shape allowing backward displacement of one end side of the clutch weight in a rotary drive direction of the drive plate, and the swing support pin is slidably displaceably fitted in the pin slide hole through the pivot-point-side slide member.

2. The centrifugal clutch according to claim 1, wherein each of the swing support pin and the pin slide hole is made of a metal material, and
the pivot-point-side slide member is made of a resin material.

3. The centrifugal clutch according to claim 1, wherein the pivot-point-side slide member is rotatably slidably fitted onto the swing support pin.

4. The centrifugal clutch according to claim 1, further comprising an auxiliary pivot-point-side slide member provided between the swing support pin and the pivot-point-side slide member.

5. The centrifugal clutch according to claim 1, wherein one of portions of the protruding body and the driven portion sliding on each other is made of a metal material, and the other one of the portions is made of a resin material.

6. The centrifugal clutch according to claim 1, wherein the protruding body is rotatably provided at a protruding body support pin provided on the drive plate, and
includes an auxiliary swing-side slide member provided between the protruding body support pin and the protruding body.

7. The centrifugal clutch according to claim 1, wherein the pin slide hole is formed as a long hole with such a length that a direct contact with the pivot-point-side slide member surrounding the swing support pin is avoided even in a case where one end side of the clutch weight displaces backward in the rotary drive direction of the drive plate.

8. The centrifugal clutch according to claim 1, wherein the protruding body is rotatably provided at a protruding body support pin provided on the drive plate.

9. A centrifugal clutch comprising:
a drive plate to be rotatably driven together with a driven pulley in response to drive force of an engine;
a clutch outer having, outside the drive plate, a cylindrical surface provided concentrically with the drive plate;
a clutch weight having a clutch shoe formed to extend along a circumferential direction of the drive plate and facing the cylindrical surface of the clutch outer, one end side of the clutch weight in the circumferential direction being turnably attached onto the drive plate through a swing support pin and a pin slide hole, the other end side displacing toward a cylindrical surface side of the clutch outer;
a protruding body provided to protrude toward the clutch weight from the drive plate; and
a driven portion provided at the clutch weight and configured to climb on the protruding body upon displacement of the other end side of the clutch weight, wherein
one of portions of the protruding body and the driven portion sliding on each other is made of a metal material, and the other one of the portions is made of a resin material,
the swing support pin is provided at the drive plate, and is formed to extend toward the clutch weight, and
the pin slide hole is provided at the clutch weight and is formed in a long hole shape allowing backward displacement of one end side of the clutch weight in a rotary drive direction of the drive plate, and the swing support pin is slidably fitted in the pin slide hole.

10. The centrifugal clutch according to claim 9, wherein the pin slide hole is formed as a long hole with such a length that a direct contact with a pivot-point-side slide member surrounding the swing support pin is avoided even in a case where one end side of the clutch weight displaces backward in the rotary drive direction of the drive plate.

11. The centrifugal clutch according to claim 9, wherein the protruding body is rotatably provided at a protruding body support pin provided on the drive plate.

12. A centrifugal clutch comprising:
a drive plate to be rotatably driven together with a driven pulley in response to drive force of an engine;
a clutch outer having, outside the drive plate, a cylindrical surface provided concentrically with the drive plate;
a clutch weight having a clutch shoe formed to extend along a circumferential direction of the drive plate and facing the cylindrical surface of the clutch outer, one end side of the clutch weight in the circumferential direction being turnably attached onto the drive plate through a swing support pin and a pin slide hole, the other end side displacing toward a cylindrical surface side of the clutch outer;

a protruding body rotatably provided on a protruding body support pin provided on the drive plate and protruding toward the clutch weight;

a driven portion provided at the clutch weight and configured to climb on the protruding body upon displacement of the other end side of the clutch weight; and an auxiliary swing-side slide member provided between the protruding body support pin and the protruding body, wherein the swing support pin is provided at the drive plate, and is formed to extend toward the clutch weight, and the pin slide hole is provided at the clutch weight and is formed in a long hole shape allowing backward displacement of one end side of the clutch weight in a rotary drive direction of the drive plate, and the swing support pin is slidably fitted in the pin slide hole.

13. The centrifugal clutch according to claim 12, wherein the pin slide hole is formed as a long hole with such a length that a direct contact with a pivot-point-side slide member surrounding the swing support pin is avoided even in a case where one end side of the clutch weight displaces backward in the rotary drive direction of the drive plate.

\* \* \* \* \*